US005760144A

United States Patent [19]

Ozeki et al.

[11] Patent Number: 5,760,144
[45] Date of Patent: Jun. 2, 1998

[54] ALIPHATIC POLYESTER POLYMER BLENDS, METHODS FOR MANUFACTURING THE SAME, AND METHODS FOR MILDING ALIPHATIC POLYESTER POLYMER BLENDS

[75] Inventors: Eiichi Ozeki, Kyoto; Jun Nagata, Chofu; Teizi Urakami, Tokyo, all of Japan

[73] Assignees: Mitsubishi Gas Chemical Company, Inc., Tokyo, Japan; Shimadzu Corporation, Kyoto, Japan

[21] Appl. No.: 678,661

[22] Filed: Jul. 11, 1996

[30] Foreign Application Priority Data

Jul. 13, 1995 [JP] Japan .................................. 7-201551
Jul. 13, 1995 [JP] Japan .................................. 7-201552

[51] Int. Cl.⁶ .................................................. C08F 20/00
[52] U.S. Cl. ........................ 525/450; 525/437; 525/444; 264/239; 264/331.11
[58] Field of Search ................................ 525/437, 444, 525/450; 264/239, 331.11

[56] References Cited

U.S. PATENT DOCUMENTS

| | | | |
|---|---|---|---|
| 4,839,130 | 6/1989 | Kaplan et al. | 264/235 |
| 5,124,371 | 6/1992 | Tokiwa et al. | 523/124 |
| 5,409,751 | 4/1995 | Suzuki et al. | 428/36.9 |
| 5,545,485 | 8/1996 | Hashitani et al. | 428/423.1 |
| 5,550,173 | 8/1996 | Hammond et al. | 523/122 |
| 5,679,421 | 10/1997 | Brinton, Jr. | 428/34.3 |
| 5,691,424 | 11/1997 | Suzuki et al. | 525/411 |

FOREIGN PATENT DOCUMENTS

| | | |
|---|---|---|
| 0 281 482 A1 | 9/1988 | European Pat. Off. . |
| 0 328 421 A2 | 8/1989 | European Pat. Off. . |
| 0 481 732 A1 | 4/1992 | European Pat. Off. . |
| 0 556 357 A1 | 10/1993 | European Pat. Off. . |
| 0 585 151 A1 | 3/1994 | European Pat. Off. . |
| 42 33 541 A1 | 4/1994 | Germany . |
| WO 89/04673 | 6/1989 | WIPO . |
| WO 94/07941 | 4/1994 | WIPO . |
| WO 94/11445 | 5/1994 | WIPO . |

OTHER PUBLICATIONS

Chemical Abstracts, vol. 122, No. 22, Abstract No. 266842 (May 1995).
J. Macromol Science–Pur Appl. Chem., 'Effect of Degradation on the Mechanical Properties of Multiphase Polymer Blends: PHBV/PLLA', vol. A32, No. 4, pp. 771–778 (Mar. 1995).

*Primary Examiner*—Samuel A. Acquah
*Attorney, Agent, or Firm*—Cushman Darby & Cushman IP Group of Pillsbury Madison & Sutro

[57] ABSTRACT

Biodegradable polymer blends comprising of a polylactic acid or a copolymer containing lactic acid as the main constituent, and a polyhydroxyalkanoate or a copolymer containing two or more hydroxyalkanoic acids as the constituents; methods for controlling the rate of biodegradation of a polylactic acid or a copolymer containing lactic acid as the main constituent, by blending as above; methods for manufacturing such aliphatic polyester polymer blends; and methods for molding such polymer blends; are provided.

The aliphatic polyester polymer blends obtained in the invention are colorless and clear, and have excellent biodegradabilities, as well as excellent mechanical strengths. The blends can be molded similarly as in conventional thermoplastic resins, so that they can be utilized in many industries, without problems in the waste product treatment after the use. Furthermore, molded products with excellent qualities are obtained from the blends, because of their improved moldabilities.

7 Claims, No Drawings

ALIPHATIC POLYESTER POLYMER BLENDS, METHODS FOR MANUFACTURING THE SAME, AND METHODS FOR MILDING ALIPHATIC POLYESTER POLYMER BLENDS

BACKGROUND OF THE INVENTION

1. Field of the Invention

This invention relates to aliphatic polyester polymer blends having excellent biodegradability, which comprises polylactic acid or a copolymer containing lactic acid as the main constituent, and a polyhydroxyalkanoate or a copolymer containing two or more hydroxyalkanoic acids as the constituents; methods for manufacturing such aliphatic polyester polymer blends; and methods for molding the apiphatic polyester polymer blends.

2. Description of the Prior Art

Concerning the problems in plastic waste product treatments, development studies on biodegradable resins have so far been made extensively. Polylactic acid and copolymers containing lactic acid as the main constituent, as well as polyhydroxyalkanoates and copolymers containing two or more hydroxyalkanoic acids as the constituents, are severally known as biodegradable aliphatic polyesters.

Polylactic acid and copolymers containing lactic acid as the main constituent have been manufactured normally by chemical synthesis. They are aliphatic polyesters having biodegradability, and have a mechanical strength equivalent to that of other thermoplastic resins. However, they are unavoidable from such problems as that their biodegradability is not yet satisfactory from the practical viewpoints, the molding temperature tolerance is narrow because of their higher melting points and relatively close molding temperatures to the temperatures at which the thermal decomposition begins, thus causing difficulties in controlling such temperatures.

In the industry, accordingly, the advent of biodegradable polymers which are excellent in both mechanical strength and biodegradability, free from the troubles in waste product treatments after the use, and applicable in wide industries, as well as a method for molding such biodegradable polymers easily and within shorter period of time, has been highly desired.

SUMMARY OF THE INVENTION

The present invention is to eliminate such disadvantages, and objects of the invention are to provide polymer compositions which are excellent in both mechanical strength and biodegradability; methods for manufacturing the same; and methods for molding such compositions easily and within shorter period of time.

To solve such problems, the present inventors have accomplished the invention by blending the polylactic acid or a copolymer containing lactic acid as the main constituent, which is an aliphatic polyester, with a polyhydroxyalkanoate or a copolymer containing two or more hydroxyalkanoic acids as the constituents, which is also an aliphatic polyester, and furthermore by melt-kneading the both polymers using a thermal extruder.

As for decomposition under the natural environment of polylactic acid and copolymers containing lactic acid as the main constituent, chemical hydrolysis is dominant at the early stage, and then lactic acid formed by the hydrolysis is decomposed through metabolism of microorganisms. On the other hand, polyhydroxyalkanoates and copolymers containing two or more hydroxyalkanoic acids as the constituents begin to be decomposed through metabolism of microorganisms from the early stage. In the present invention, accordingly, the biodegradability is improved by controlling the rate of degradation in such a way that a polymer which is dominantly hydrolyzed prior to biodegradation is homogeneously dispersed in another polymer which is dominantly decomposed through metabolism of microorganisms, and the polymer compositions of this invention give the improved moldability.

Thus, the present invention relates to (1) biodegradable aliphatic polyester polymer blends, which comprises a polylactic acid or a copolymer containing lactic acid as the main constituent, and a polyhydroxyalkanoate or a copolymer containing two or more hydroxyalkanoic acids as the constituents;

(2) biodegradable aliphatic polyester polymer blends according to (1) mentioned above, wherein the blending amount of the polyhydroxyalkanoate or the copolymer containing two or more hydroxyalkanoic acids as the constituents is 5 to 50% by weight, based upon the total amount of the polylactic acid or the copolymer containing lactic acid as the main constituent, and the polyhydroxyalkanoate or the copolymer two or more hydroxyalkanoic acids as the constituents;

(3) methods for controlling the rate of biodegradation of a polylactic acid or a copolymer containing lactic acid as the main constituent, by blending to it a polyhydroxyalkanoate or a copolymer containing two or more hydroxyalkanoic acids as the constituents;

(4) methods for manufacturing aliphatic polyester polymer blends, which comprises melt-kneading a polylactic acid or a copolymer containing lactic acid as the main constituent, and a polyhydroxyalkanoate or a copolymer containing two or more hydroxyalkanoic acids as the constituents in a thermal extruder;

(5) methods for manufacturing aliphatic polyester polymer blends according to (4) mentioned above, wherein the polylactic acid or the copolymer containing lactic acid as the main constituent (which may be referred to as "L-polymer" hereinafter), and the polyhydroxyalkanoate or the copolymer continuing two or more hydroxyalkanoic acids as the constituents (which may be referred to as "H-polymer" hereinafter) are blended in a blending ratio of 5 to 50% by weight of [H-polymer/(L-polymer+H-polymer)]×100%;

(6) methods for manufacturing aliphatic polyester polymer blends according to (4) or (5) mentioned above, wherein the polylactic acid or the copolymer containing lactic acid as the main constituent has a melt viscosity at the melt-kneading temperature of not less than 1,000 poise;

(7) methods for molding aliphatic polyester polymer blends, which comprises melt-kneading and molding a polylactic acid or a copolymer containing lactic acid as the main constituent, together with a polyhydroxyalkanoate or a copolymer containing two or more hydroxyalkanoic acids as the constituents in a thermal extruder;

(8) methods for molding aliphatic polyester polymer blends according to (7) mentioned above, wherein the polylactic acid or the copolymer containing lactic acid as the main constituent, and the polyhydroxyalkanoate or the copolymer containing two or more hydroxyalkanoic acids as the constituents are blended in a blending ratio of 5 to 50% by weight of [H-polymer/(L-polymer+H-polymer)]×100%;

(9) methods for molding aliphatic polyester polymer blends according to (7) or (8) mentioned above, wherein the polylactic acid or the copolymer containing lactic acid as the main constituent has a melt viscosity at the melt-kneading temperature of not less than 1,000 poise; and

(10) molded products produced from a aliphatic polyester polymer blend comprising a polylactic acid or a copolymer containing lactic acid as the main constituent, and a polyhydroxyalkanoate or a copolymer containing two or more hydroxyalkanoic acids as the constituents.

The polymer blends of the present invention comprise polylactic acid or a copolymer containing lactic acid as the main constituent, and a polyhydroxyalkanoate or a copolymer containing two or more hydroxyalkanoic acids as the constituents.

Polylactic acid used in the invention may be any of commercially available ones, for example, "LACTY", manufactured by Shimadzu Corporation, or others obtained by various polymerization methods. The copolymers containing lactic acid as the main constituent include those containing polyethylene glycol as the principal chain, for example, those described in Japanese Laid-Open Patent Publication No. 95-165896, which are copolymers prepared by polymerization of L-lactic acid and/or D-lactic acid with polyethylene glycol having a number-average molecular weight of not less than 300,000, in a definite proportion.

In any cases, the molecular weight is preferably not less than 100,000, more preferably 100,000 to 300,000, in the weight-average base, from the viewpoints of the mechanical strength and melt viscosity.

Melting point of the L-polymer varies depending on the polymerization degree, as well as the kind of another monomer constituent in the copolymer, but it is about 170° C. in case of polylactic acid, within the range of preferred weight-average molecular weights as mentioned above.

Polymerization for L-polymers may be conducted using the material(s), for example, lactic acid, lactide, lactic acid with polyethylene glycol or lactide with polyethylene glycol, together with an adequate catalyst, in the presence of an H-polymer. This method is preferred, since it gives a homogeneous blend of L- and H-polymers. In case of using lactide as the L-polymer material and its ring-opening polymerization being subjected in the presence of an H-polymer, tin octanoate is a preferred polymerization catalyst.

Polyhydroxyalkanoates and the copolymers containing two or more hydroxyalkanoic acids as the constituents, used in the invention, are those having weight-average molecular weights of 100,000 to 150,000 in the form of fine powder, with a melting point of about 110 to about 180° C. Typical polyhydroxyalkanoates include poly-3-hydroxybutyrate (PHB), poly-3-hydroxyvalerate and poly-4-hydroxybutyrate. Typical copolymers having two or more hydroxyalkanoic acids include poly-(3-hydroxybutyric acid-3-hydroxyvaleric acid) and poly-(3-hydroxybutyric acid-4-hydroxyvaleric acid).

The copolymers may contain two or more different hydroxyalkanoic acids as the constituents in various composition ratios.

Each of polyhydroxyalkanoates and the copolymers containing two or more hydroxyalkanoic acids as the constituents is generally originated from microorganisms. As for such microorganisms, *Protomonas extorguens* K (FERM BP-3548), *Hyphomicrobium methylovorum* IFO 14180, *Hyphomicrobium hollandicum* ATCC 27498, *Methylobacterium fujisawaense* NCIB 12417, *Paracoccus denitrificans* ATCC 17441, *Alcaligenes eutrophus* ATCC 17697, *Pseudomonas lemonnieri* ATCC 17989 may be illustrated. Details of the method to prepare these polymers have been disclosed, for example, in Japanese Laid-open Patent Publications Nos. 93-7492 and 95-75590.

Each of polyhydroxyalkanoates and the copolymers containing two or more hydroxyalkanoic acids as the constituents has good compatibility to polylactic acid or copolymers containing lactic acid as the main constituent, and gives colorless clear molten polymer blends, when the weight-average molecular weight is lower than 200,000. On the other hand, the compatibility is not satisfactory, and color tone of the resulting molten polymer blends is not favorable, when the weight-average molecular weight is higher than 300,000. Even in such a case, the compatibility can be improved, and colorless clear molten polymer blends can be obtained, by decreasing the molecular weight down to not higher than 200,000, for example, through blending under a high shearing force.

In the aliphatic polyester polymer blends of the present invention, or, in the aliphatic polyester polymer blends to be melt-kneaded for molding according to the invention, the blending amount of a polyhydroxyalkanoate or a copolymer containing two or more hydroxyalkanoic acids is preferably 5 to 50%, more preferably 10 to 30%, by weight, based upon the total amount of the aliphatic polyester polymer blend. If the blending amount is less than 5% by weight, the biodegradability of the molded product is not much improved. If the blending amount exceeds 50% by weight, the compatibility of the both polymers is inferior, and color tone of the molded product is not satisfactory. But in this invention, the blending amount can be outside the range and is not limitative.

The aliphatic polyester polymer blends are preferably obtained according to a manufacturing method of the present invention which will be described hereinafter, but the method should not be construed to be limitative for the invention.

The method for manufacturing the aliphatic polyester polymer blends according to the invention is characterized by melt-kneading polylactic acid or a copolymer containing lactic acid as the main constituent, and a polyhydroxyalkanoate or a copolymer containing two or more hydroxyalkanoic acids as the constituents, using a thermal extruder in a blending ratio of 5 to 50% by weight of the polyhydroxyalkanoate or the copolymer containing two or more hydroxyalkanoic acids as the constituents, based upon the total amount of the both polymers to be blended. In this manufacturing method, a molten polymer blend with a higher transparency is obtained by using selected polylactic acid or copolymer containing lactic acid as the main constituent which has preferably a melt viscosity at the temperature of melt-kneading of not less than 1,000 poise.

Hereupon, the melt viscosity of polylactic acid or the copolymers containing lactic acid as the main constituent is preferably not less than 1,000 poise, more preferably 10,000 to 1,000,000 poise, at the temperature of melt-kneading of the polymer together with a polyhydroxyalkanoate or a copolymer containing two or more hydroxyalkanoic acids as the constituents. Also, the polyhydroxyalkanoate and the copolymers containing two or more hydroxyalkanoic acids as the constituents, used herein, may be those having melting points of not higher than about 180° C., and the molten resin temperature may be set up to 190 to 200° C. Consequently, melt viscosity of the aliphatic polyester polymer blend in a thermal extruder is kept at a higher level, and the decrease in the molecular weight of the polyhydroxyalkanoate or the copolymer containing two or more hydroxyalkanoic acids as the constituents is promoted, thus yielding a colorless clear molten polymer blend. On the other hand, if melt viscosity of the polylactic acid or the copolymer containing lactic acid as the main constituent, at the temperature of melt-kneading, is less than 1,000 poise, the decrease in the molecular weight of the polyhydroxyalkanoate or the copolymer containing two or more hydroxyalkanoic acid as the constituents, is not promoted, because of the lower viscosity, thus, colorless clear molten polymer being difficulty obtained.

Further, the moldability at lower temperatures of polylactic acid or a copolymer containing lactic acid as the main constituent is improved by blending to it a polyhydroxyalkanoate or a copolymer containing two or more hydroxyalkanoic acids as the constituents.

In the aliphatic polyester polymer blends of the invention, the both polymers may be blended in the presence of another biodegradable polymer, such as polycaprolactam, and additives.

In the method for molding according to the invention, any of thermal extruders may be used. The thermal extruders are defined as molding machines which provide with a cylinder or barrel in order to heat and melt molding plastic materials, and in which the molding plastic materials in the cylinder or barrel are heated and molten to form a uniform flow which is then extruded. Using the thermal extruders, for example, extrusion molding, injection molding, blow molding, etc. are effected.

According to the molding method of the present invention, for example, films, fibers, and other molded products can be obtained at will from the aliphatic polyester polymer blends of the invention, as mentioned above.

DESCRIPTION OF THE PREFERRED EMBODIMENTS

The invention will more fully be described in reference to the following examples, which are, however, merely illustrative and should not be construed to be limitative.

Example 1

Into an extruder were charged 100 g of L-lactide (trade name: LACTY, manufactured by Shimadzu Corporation; melt viscosity at 195° C. being 200,000 poise; weight-average molecular weight being 200,000), a definite amount of poly-3-hydroxybutyric acid (melt viscosity at 185°0 C. being 6,000 poise; weight-average molecular weight being 350,000), and a catalytic amount of tin octanoate, and the mixture was melt-kneaded at a temperature of 195° C. for 10 minutes under nitrogen atmosphere. During the course of the time period, the L-lactide was polymerized to finally form a aliphatic polyester polymer blend of polylactic acid and poly-3-hydroxybutyric acid in the definite blending amounts (the blending amount being as defined above). From the aliphatic polyester polymer blend, a film of 1 mm thickness was prepared according to the chloroform casting method (10% by weight concentration). Using its test pieces, the biodegradability, as well as light transmission before the biodegradability test, was measured.

Test pieces for biodegradability were each 5 cm×5 cm square film.

The blending amount of poly-3-hydroxybutyric acid in the total amount of the both polymers was 0%, 1%, 5% or 10% by weight, respectively.

Evaluation of the film was made as follows:
Biodegradability test was conducted at outdoors by burying the test pieces into a commercially available leaf mold in 10 cm depth from the surface of the leaf mold, digging out the pieces after 3 moths, and observing the biodegradability by eye, with the following degrees of biodegradation.

| Δ: no change |
|---|
| o: whitened |
| ⊙: degraded |

Light transmission was measured according to JIS K0115. The results are shown in Table 1.

TABLE 1

| Blending amounts (wt %) | 0 | 1 | 5 | 10 |
|---|---|---|---|---|
| Light transmissions (%) | 94 | 94 | 92 | 90 |
| Biodegradabilities | Δ | o | ⊙ | ⊙ |

The results in Table 1 exhibit that the biodegradability is improved in the cases of not less than 1% by weight blending amounts of poly-3-hydroxybutyric acid, while the light transmission is kept high even in the case of 10% by weight.

Example 2

Into an injection molding machine were charged polylactic acid (trade name; LACTY, manufactured by Shimadzu Corporation; melt viscosity at 195° C. being 200,000 poise; weight-average molecular weight being 200,000) and poly-3-hydroxybutyric acid (melt viscosity at 185° C. being 6,000 poise; weight-average molecular weight being 350,000) in a definite weight ratio with the total amount of 170 g, and the mixture was melt-kneaded at a temperature of 195° to 230° C. for molding to make test pieces of each 0.3 mm thickness and 6.5 mm length. The blending amount of poly-3-hydroxybutyric acid in the total amount of both polymers 0%, 1%, 5% or 10% by weight, respectively.

Evaluation of the molded product (test pieces) was made by measuring "the suitable molding temperature".

When a molding temperature is too low, a melted product cannot flow smoothly inside a die due to high viscosity. Therefore the lowest temperature at which the melted product can flow smoothly due to appropriate viscosity is defined to be "the suitable molding temperature".

The biodegradability test was conducted in the similar way as in Example 1.

Using the molded product before the biodegradability test, transparency was observed by eye, with the following degrees of biodegradation.

| ⊙: fully transparent |
|---|
| o: transparent (with slight clouds) |

The results are shown in Table 2.

TABLE 2

| Blending amounts (wt %) | 0 | 1 | 5 | 10 |
|---|---|---|---|---|
| The suitable molding temperature (°C.) | 230 | 220 | 210 | 195 |
| Transparencies | ⊙ | ⊙ | o | o |
| Biodegradabilities | o | o | o | o |

The results in Table 2 exhibit that when the blending amount of poly-3-hydroxybutyric acid increases, "the suitable molding temperature" lowers accordingly, while retaining the high transparency and excellent biodegradability. The lower "the suitable molding temperature" is, the better the molding condition is, because coloring and cracks were less observed in the case of lower "the suitable molding temperature".

Example 3

Into an extruder were charged polylactic acid (trade name: LACTY, manufactured by Shimadzu Corporation; melt viscosity at 195° C. being 200,000 poise; weight-average molecular weight being 200,000) and poly-3-hydroxybutyric acid (melt viscosity at 185° C. being 6,000 poise; weight-average molecular weight being 350,000) in a definite weight ratio with the total amount of 170 g, and the mixture was melt-kneaded at a temperature of 195° C. for 8 minutes to make a aliphatic polyester polymer blend, which had a viscosity at the melt-kneading temperature of 30,000 poise.

The blending amount of poly-3-hydroxybutyric acid based on the total amount of the both polymers was 0%, 1%, 5% or 10% by weight, respectively.

In similar way as in Example 1, a film of 1 mm thickness was prepared according to the chloroform casting method (10% by weight concentration). Strength test was made using its test pieces.

The strength test was conduct according to ASTM D638

In the cases of the blending amounts of poly-3-hydroxybutyric acid based on the aliphatic polyester polymer blend being not less than 5% by weight, slight clouds were observed in the test pieces, while still retaining the high transparencies.

The results are shown in Table 3.

TABLE 3

| Blending amounts (wt %) | 0 | 1 | 5 | 10 |
| --- | --- | --- | --- | --- |
| Strength (Mpa) | 100.9 | — | 97.1 | 96.8 |
| Biodegradabilities | Δ | Δ | ○ | ⊚ |

The results in Table 3 exhibit that, when the blending amount of poly-3-hydroxybutyric acid are not less than 5% by weight, the biodegradalilities are improved, while retaining the high strengthes.

Thus, the aliphatic polyester polymer blends obtained according to the invention are excellent in mechanical strength and in biodegradability, and have a high transparency. The aliphatic polyester polymer blends can be molded in similar way as in the conventional thermoplastic resins, so that they can be utilized broadly in many industries, without the problems in the treatment of waste products after the use.

Method for molding the aliphatic polyester polymer blends according to the invention gives molded products of aliphatic polyesters having equivalent mechanical strength to that of conventional thermoplastic resins, which products have improved moldability and can be readily molding within a shorter period of time.

We claim:

1. A biodegradable aliphatic polyester blend which comprises a polylactic acid having a weight-average molecular weight of not less than 100,000 and a poly-3-hydroxybutyrate, wherein of the poly-3-hydroxybutyrate is 5 to 50% by weight of said blend based upon the total amount of the polylactic acid and the poly-3-hydroxybutyrate.

2. A method for controlling the rate of biodegradation of a polylactic acid having a weight-average molecular weight of not less than 100,000 by blending it with a selected quantity of poly-3-hydroxybutyrate.

3. A method for manufacturing aliphatic polyester blends which comprises the step of melt-kneading a polylactic acid having a weight-average molecular weight of not less than 100,000 and a poly-3-hydroxybutyrate in a thermal extruder, wherein the polylactic acid and the poly-3-hydroxybutyrate are blended in a blending ratio of 5 to 50% by weight of the poly-3-hydroxybutyrate based upon the total amount of the polylactic acid and the poly-3-hydroxybutyrate.

4. A method for manufacturing aliphatic blends according to claim 3, wherein the polylactic acid has a melt viscosity at the melt-kneading temperature of not less than 1,000 poise.

5. A method for molding aliphatic polyester blends which comprises the step(s) of melt-kneading and molding a polylactic acid having a weight-average molecular weight of not less than 100,000 and a poly-3-hydroxybutyrate in a thermal extruder, wherein the polylactic acid and the poly-3-hydroxybutyrate are blended in a blending ratio of 5 to 50% by weight of the poly-3-hydroxybutyrate based upon the total amount of the polylactic acid and the poly-3-hydroxybutyrate.

6. A method for molding aliphatic polyester blends according to claim 5, wherein the polylactic acid has melt viscosity at the melt-kneading temperature of not less than 1,000 poise.

7. A molded product produced from an aliphatic polyester blend comprising a polylactic acid having a weight-average molecular weight of not less than 100,000 and a poly-3-hydroxybutyrate, wherein the amount of the poly-3-hydroxybutyrate is 5 to 50% by weight based upon the total amount of the polylactic acid and the poly-3-hydroxybutyrate.

* * * * *